US008874616B1

(12) United States Patent
Coffman et al.

(10) Patent No.: US 8,874,616 B1
(45) Date of Patent: Oct. 28, 2014

(54) METHOD AND APPARATUS FOR FUSION OF MULTI-MODAL INTERACTION DATA

(75) Inventors: Thayne Richard Coffman, Cedar Park, TX (US); Jonathan William Mugan, Buda, TX (US); Eric John McDermid, Cedar Park, TX (US)

(73) Assignee: 21CT, Inc., Austin, TX (US)

( * ) Notice: Subject to any disclaimer, the term of this patent is extended or adjusted under 35 U.S.C. 154(b) by 0 days.

(21) Appl. No.: 13/546,954

(22) Filed: Jul. 11, 2012

Related U.S. Application Data

(60) Provisional application No. 61/506,582, filed on Jul. 11, 2011.

(51) Int. Cl.
*G06F 17/30* (2006.01)

(52) U.S. Cl.
USPC .......................................................... 707/798

(58) Field of Classification Search
None
See application file for complete search history.

(56) References Cited

U.S. PATENT DOCUMENTS

| | | | | |
|---|---|---|---|---|
| 2006/0085370 | A1* | 4/2006 | Groat et al. | 707/1 |
| 2007/0286218 | A1* | 12/2007 | Zhang et al. | 370/401 |
| 2007/0299872 | A1* | 12/2007 | Bier | 707/104.1 |
| 2009/0271363 | A1* | 10/2009 | Bayliss | 707/2 |
| 2011/0295982 | A1* | 12/2011 | Misra | 709/220 |
| 2012/0016948 | A1* | 1/2012 | Sinha | 709/207 |
| 2013/0163471 | A1* | 6/2013 | Indukuri et al. | 370/255 |

OTHER PUBLICATIONS

Intelligent System Design and Applications by Ajith Abraham, Katrin Franke, Mario Koppen, ISBN 3-540-40426-0 Springer 2003.*
Social Network Analysis as an Approach to Combat Terrorism: Past, Present, and Future Research written by Steve Ressler, Homeland Security Affair, vol. II, No. 2 (Jul. 2006).*
Santo Fortunato, Community detection in graphs.*
John Gersh,Supporting insight_based Information exploration in intelligence analysis.*
Amit Bagga, Entity Based Cross document Coreferencing Using the Vector Space Model.*
Heeyoung Lee, Joint Entity and Event Coreference Resolution Across Documents.*
Zhaoqi Chen,Exploiting Context Analysis for Combining Multiple Entity Resolution Systems.*
Shahriar Hossain, Storytelling in Entity Networks to Support Intelligence Analysists.*
Narrullah Memon,Detecting Hidden Hierarchy in Terrorist Networks Some Case Studies.*
David Hall, An Introduction to Multisensor Data Fusion.*
Thayne Coffman, Graph Based Technologies for Intelligence Analysis.*
William Winkler, Matching and Record Linkage.*
Bhattacharya, Collective Entity Resolution in Relation Data.*

* cited by examiner

*Primary Examiner* — Robert Beausoliel, Jr.
*Assistant Examiner* — Hau H Hoang
(74) *Attorney, Agent, or Firm* — J. Roger Williams, Jr.; Andrews Kurth LLP

(57) ABSTRACT

Disclosed is a method for fusing interaction data, such as intelligence data, comprising, embodying collections of interaction data from different interaction data sources in interaction graphs, defining a plurality of mappings of identifiers to entities, associating each mapping with a fused interaction graph, and identifying an optimal mapping by evaluation of compatibility of identifier attributes, mutual information across interaction data sources, and/or fit with one or more behavior models. Edges in the fused graph can be collapsed. Also claimed are a computer system and a computer-readable medium for fusing interaction data.

55 Claims, 11 Drawing Sheets

900

| | |
|---|---|
| IMINT: | $n_1, n_{12}, n_{13} \ldots, n_{1k}$ |
| SIGACT: | $n_{21}, n_{22}, n_{23} \ldots, n_{2j}$ |
| ... | ... |
| DNE: | $n_{m1}, n_{m2}, n_{m3} \ldots, n_{mp}$ |

$$G_i = (N_i, E_i) \quad N_i = \{n_{i1}, n_{i2}, \ldots n_{ij}\}$$

FIG. 9

1000

$$x_1 = (n_{11}, n_{27}, n_{34})_{P=0.7},$$
$$x_2 = (n_{12}, n_{33})_{P=0.9},$$
$$x_3 = (n_{23}, n_{41}, n_{42})_{P=0.5}, \ldots$$

FIG. 10

1100

$$G = (X, (\bigcup_{i=1\ldots m} E_i ; X))$$

FIG. 11

1200

$$Fit(X;E_1,\ldots,E_m) = \alpha \cdot \sum_{i=1\ldots m} AF(X_i) + \beta \cdot MI(E_1,\ldots,E_m ; X) + \gamma \cdot MF\left(\bigcup_{i-1\ldots m} E_i ; X\right)$$

1210 1220 1230

FIG. 12

| | | | |
|---|---|---|---|
| Good map | High attr MI | High link MI | Fused links have expected SNA traits |
| Bad map | Low attr MI | Low link MI | Fused links look random |

METHOD AND APPARATUS FOR FUSION OF MULTI-MODAL INTERACTION DATA

CROSS-REFERENCE TO RELATED APPLICATIONS

This application claims the priority of U.S. Provisional Application Ser. No. 61/506,582, entitled "A Method And Apparatus For Fusion Of Multi-Modal Intelligence Data," which was filed Jul. 11, 2011 and is incorporated herein by reference.

GOVERNMENT RIGHTS

Embodiments of the invention were made with government support under contract number N00014-09-C-0262 awarded by the Office of Naval Research. The government has certain rights in the invention.

FIELD OF THE INVENTION

The invention relates generally to the fusion and analysis of interaction data, including intelligence data.

BACKGROUND OF THE INVENTION

Students of human behavior now have access to a variety of types and sources of data regarding human interactions. In the intelligence field, for example, an intelligence analyst may have access to multiple modalities of intelligence data, including human intelligence (HUMINT), Significant Activity (SIGACT) reports, imagery intelligence (IMINT), communications intelligence (COMINT), and digital network exploitation (DNE) data. Outside of the intelligence communication, Other potential modalities of interaction data include social media communications (e.g., blogs or Twitter), computer network connections, email records, and telephone records. The term INT is used here to refer generally to interaction data from any modality, and Multi-INT refers to interaction data obtained from multiple interaction data sources, which may include interaction data from different modalities.

The following definitions are used in the remainder of the discussion:

- Associated Identifiers: In a mapping of Identifiers to Entities, two or more Identifiers are said to be associated if they are mapped to the same Entity.
- Entity: A human actor that has Relationships and generates interactions.
- Graph: Abstract representation of INT-specific observed interactions or multi-INT derived relationships. Graphs are comprised of nodes and edges. Nodes may represent Identifiers or Entities. Edges may represent Links or Relationships.
- Identifier: A moniker for an Entity within a specific INT.
- Link: Observed evidence of an interaction between two Identifiers
- Network: A coherent group of interacting Entities.
- Persona: An identifiable Entity behavior profile (either task-specific or task-independent).
- Relationship: An underlying bond that causes Entities to create one or more Links across one or more INTs.

SUMMARY OF THE CLAIMS

Disclosed herein is an embodiment of a method for fusing intelligence data from multiple intelligence modalities. The method includes representing first and second intelligence data from first and second intelligence modalities in first and second link-oriented datasets, fusing the first and second link-oriented datasets, and optimizing a mapping of identifiers from the first and second intelligence data to first and second entities, wherein the optimizing comprises consideration of link structures for the plurality of links between the first and second entities. Also disclosed is a computer system for performing the foregoing embodiment of a method for fusing intelligence data from multiple intelligence modalities.

Also disclosed herein is an embodiment of a method for fusing interaction data, where the interaction data is collected in a plurality of collections of interaction data collected from a plurality of interaction data sources, comprising embodying first and second collections of interaction data in first and second interaction graphs, defining a plurality of entity-mapping solutions, by which identifiers in the first and second collections are mapped to entities, associating with each of the plurality of entity-mapping solutions a fused interaction graph comprising a plurality of fused nodes and aggregated edges, and identifying an optimal entity mapping solution out of the plurality of entity mapping solutions, wherein identifying the optimal entity mapping solution comprises evaluation of compatibility of identifier attributes, mutual information across interaction data sources, and/or fit with one or more behavior models. Also claimed is an embodiment in which the aggregated edges are collapsed. Also claimed are a computer system for performing the foregoing embodiment of a method for fusing interaction data, and a computer-readable medium containing instructions which when executed by a processor will perform the foregoing embodiment of a method for fusing interaction data,

BRIEF DESCRIPTION OF THE DRAWINGS

Figures illustrating aspects of embodiments of a method and system for fusing multi-modal interaction data are included, as follows:

FIG. 9 depicts an exemplary symbolic representation of a Graph.

FIG. 10 depicts an exemplary symbolic representation of a mapping of Identifiers to Entities.

FIG. 11 depicts an exemplary symbolic representation of a fused Graph.

FIG. 12 depicts the equation of an exemplary objective function.

DETAILED DESCRIPTION OF THE INVENTION

A recurring task in behavioral and intelligence analysis involves deriving a Network of Entities from interaction data obtained from different sources and modalities. Several related technical needs arise in this process. One is the need to perform Multi-INT entity resolution, disambiguation, and co-referencing. This is broadly described as "fusion." Another task requires moving from Links (physical evidence of interactions) to Relationships (the reasons behind the interactions). Another task requires combined statistical and semantic analysis of Entities and Relationships. The complexity of the fused network should be minimized, and network detection accuracy and network exploitation effectiveness should be maximized. What is described here is an embodiment of a method and apparatus for Entity fusion across all-source data that minimizes fused network complexity and maximizes subsequent network exploitation effectiveness. Although there are important applications of embodiments of the invention in the intelligence field, the scope of the invention is not limited to such applications.

A technical solution has two key sub-problems: entity resolution (meaning mapping Identifiers and Links from different interaction data sources to a common Entity), and the subsequent Link collapsing. In an embodiment, accurate Identifier-to-Entity mapping (also called cross-INT entity resolution) is a prerequisite for accurately collapsing Links into Relationships; otherwise the collapsing will be based on false associations and generate ineffective results.

Figure 3:
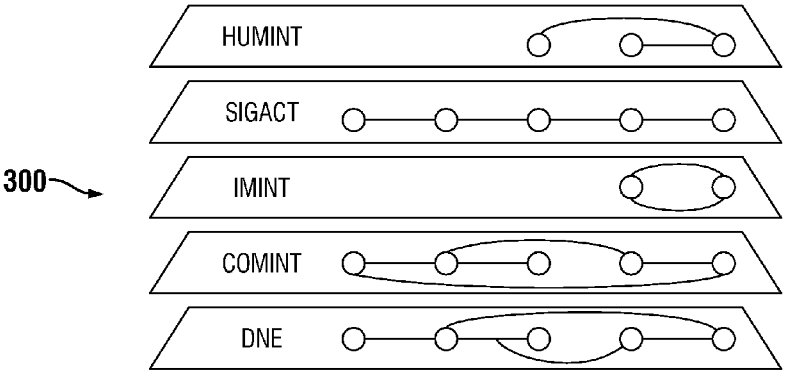
FIG. 3 depicts an exemplary repository of data from multiple intelligence modalities.
Figure 4:
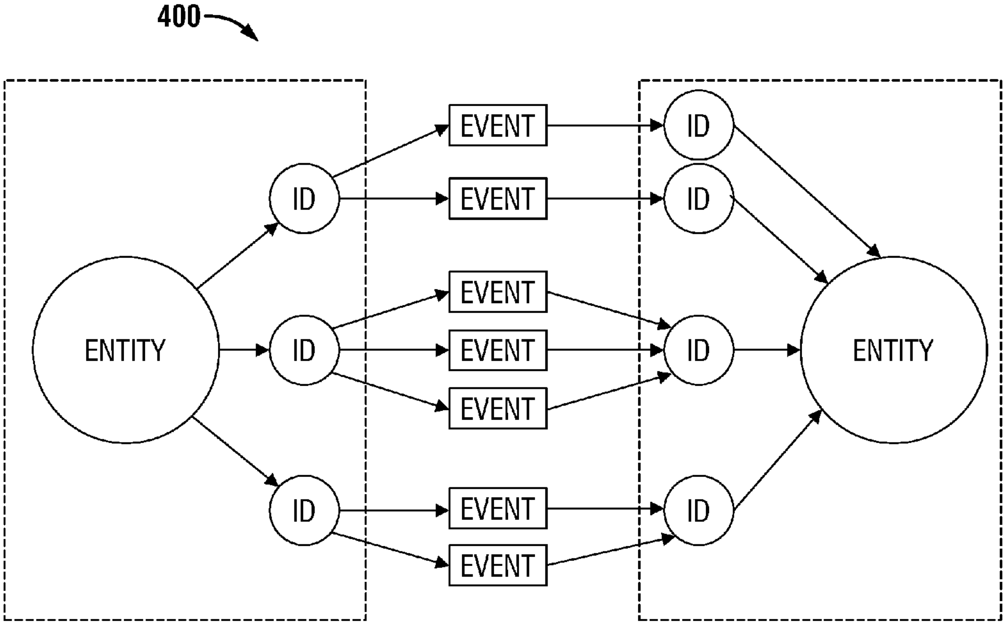
FIG. 4 depicts an exemplary mapping of INT-specific Identifiers to Entities.
Figure 5:
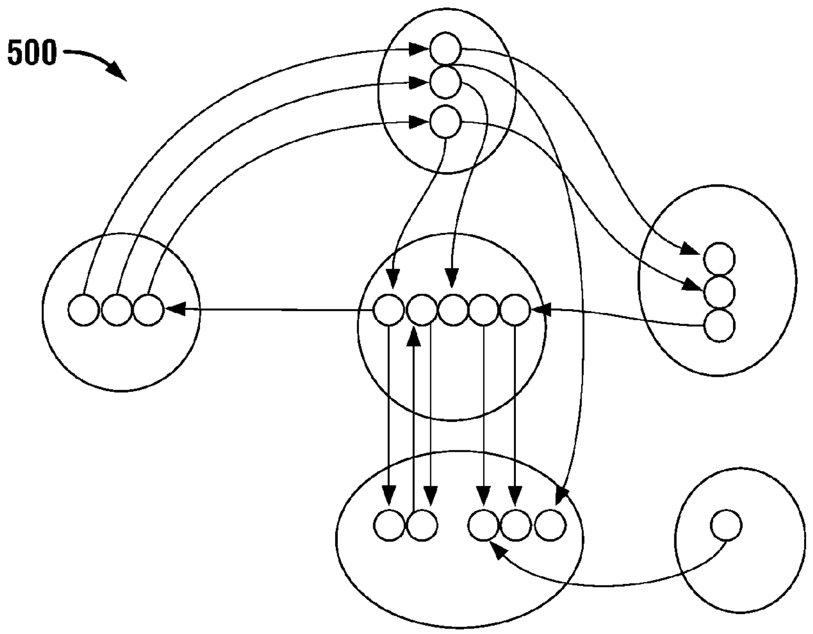
FIG. 5 depicts another view of an exemplary mapping of INT-specific Identifiers to Entities.
Figure 6:
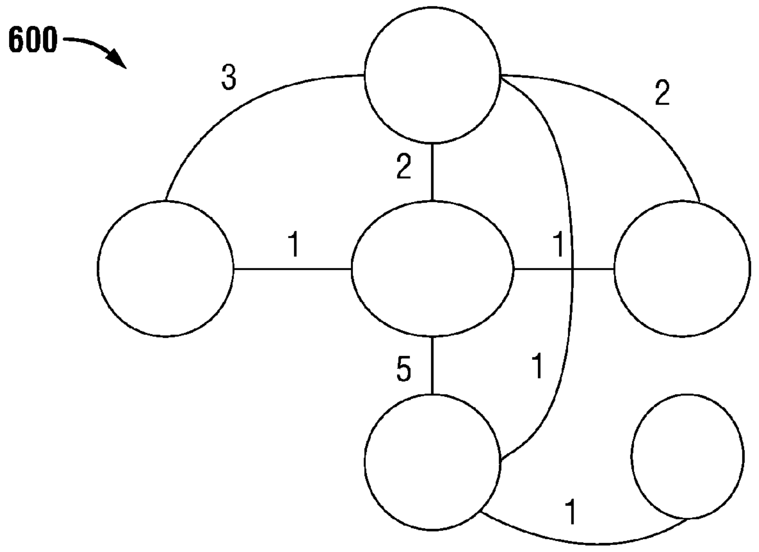
FIG. 6 depicts an exemplary collapsing of Links to Relationships.
Figure 20:
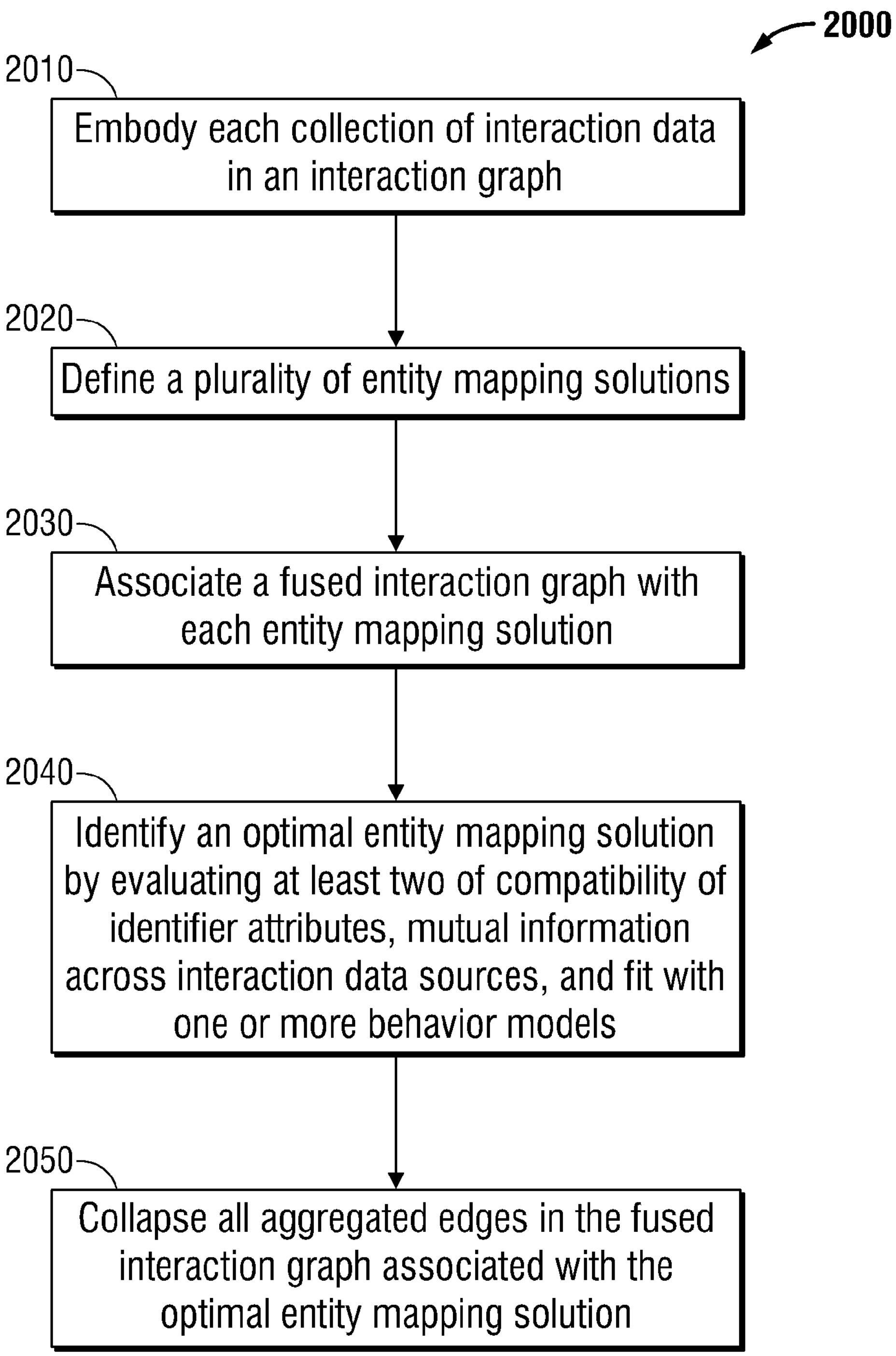
FIG. 20 is a flowchart showing the steps of an exemplary method of fusing interaction data.

An embodiment of the invention addresses the objective in several stages. FIG. 20 is a flowchart illustrating the steps of an exemplary embodiment of a method of fusing interaction data. First, as shown in FIG. 3, separate and disjoint observations from many INTs are gathered into, preferably, a single multi-INT repository 300. The scope of the invention is not limited to a specific mapping between INTs and modalities: each INT may contain interaction data from different modalities; a single INT may contain data from two or more modalities, or two more data sources or sensors of the same modality; and different INTs may contain data from the same modality or, for example, different sensors of the same modality. As shown in step 2010 of FIG. 20, the data from each INT in multi-INT repository 300 is embodied in an interaction graph. Each INT will include INT-specific Identifiers, and, as shown in step 2020 of FIG. 20, multiple possible mappings of INT-specific Identifiers to Entities are defined. FIG. 4 illustrates an exemplary Cross-INT entity resolution that maps INT-specific Identifiers to Entities. An Entity may have zero, one, or more Identifiers in each INT. Events link Identifiers to each other and are evidenced by Links. The entity resolution problem is to then map those Identifiers (and thus events and Links) to Entities that span INTs. Steps 2030 (associating a fused interaction graph with each entity mapping solution) and 2040 (identifying an optimal mapping solution) of FIG. 20 are discussed in more detail below. In step 2050 of FIG. 20, the aggregated edges between each pair of Entities, meaning all the Cross-INT edges that connect the Identifiers associated with each of the Entities, are collapsed. As shown in FIG. 5, in an embodiment, Links are collapsed into Relationships. Without an accurate Identifier-to-Entity mapping, incorrect Relationships may be formed by collapsing the wrong sets of Links. FIG. 6 shows the final result after Links are collapsed to Relationships.

Cross-INT entity resolution preferably is done in an embodiment in a model-driven optimization framework. The mapping of Identifiers (which are specific to an INT) to Entities (which span INTs) preferably consider these three factors alone or in combination: 1) the compatibility of the matched Identifiers, 2) the compatibility of Link structure across INTs, and 3) the fit of the resulting fused Link structure to applicable models. An example of compatible Identifiers is similar names—e.g., "Osama" in a SIGACT and "Usama" in a DNE result. Compatible Link structures have high mutual information. Successful Entity resolution will generate Link structures that are compatible with human interaction models such as scale-free networks, personas constructed from subject matter expertise, or known social roles such as "bridge" or "isolate."

Approach Overview

The general approach is as follows. Cross-INT entity resolution is performed within an optimization framework. The optimization identifies the best global mapping of Identifiers to Entities. The concept of "best" is defined by a multi-term objective function. In an optimal mapping of Identifiers to Entities in an embodiment, the attributes (e.g., name, gender, and geo-temporal location) of the matched Identifiers should be compatible; Link structure should exhibit high mutual information across INTs; and Link structure and Relationships should fit with behavior models and established models of expected interaction patterns.

Embodiments of the invention assume the existence of a data store and associated schema that are able to represent the multi-INT data within a multi-modal Graph. The data store preferably should be able to represent, save, load, and manipulate a plurality of Graphs. Each Graph may signify Entities and the Relationships between them, or it may signify Identifiers and the Links between them. Entities and Identifiers are represented as nodes in the Graphs. Relationships and Links are represented as edges in the Graphs. Both nodes and edges may have multiple associated attribute values. LYNXeon Analyst Studio™, commercially available from 21CT, Inc., is an example of a data store and associated schema that can provide this functionality.

Figure 7:
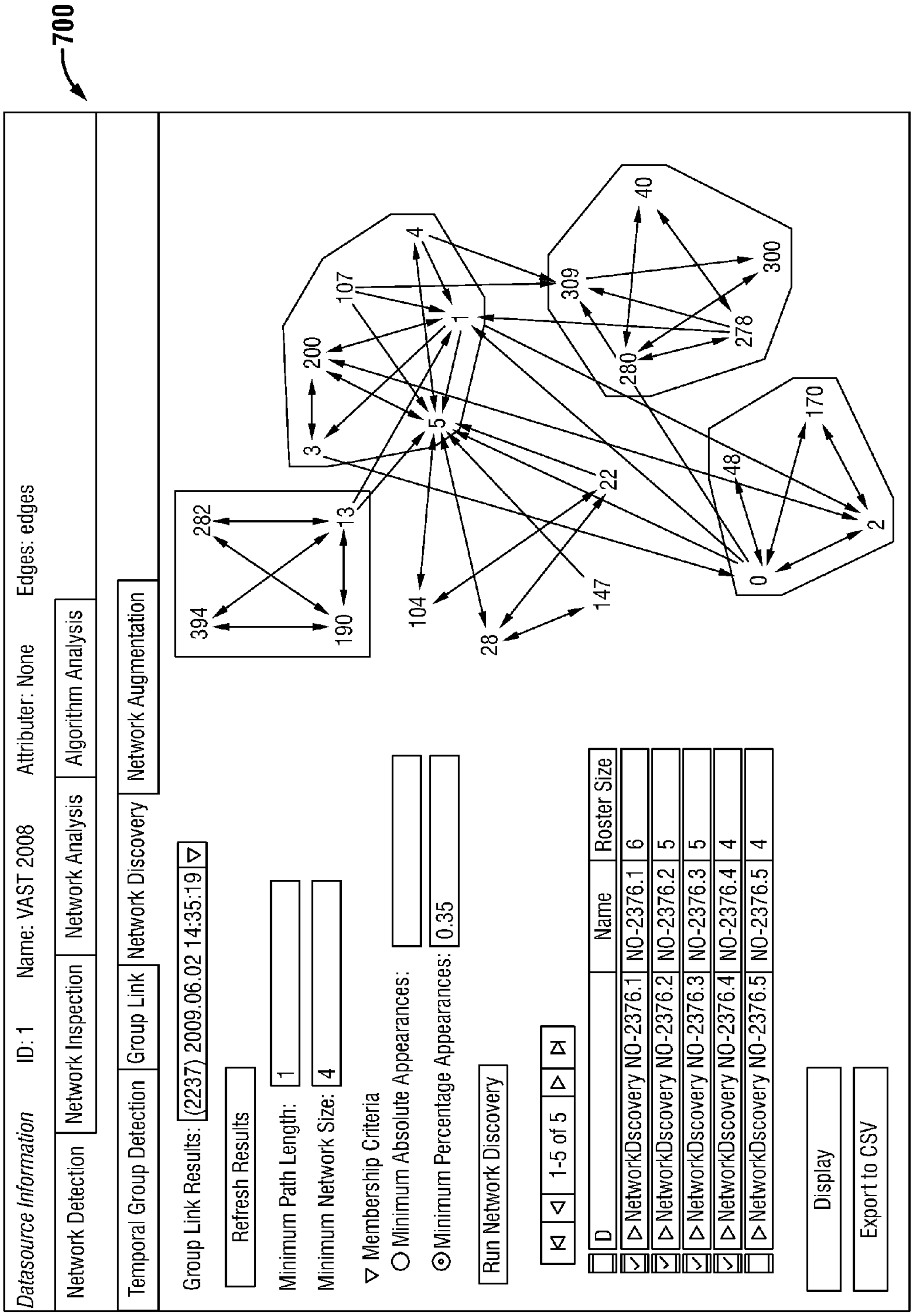
FIGS. 7 and 8 depict exemplary GUIs for visualizing identified mappings and resulting Relationship networks.
Figure 8:
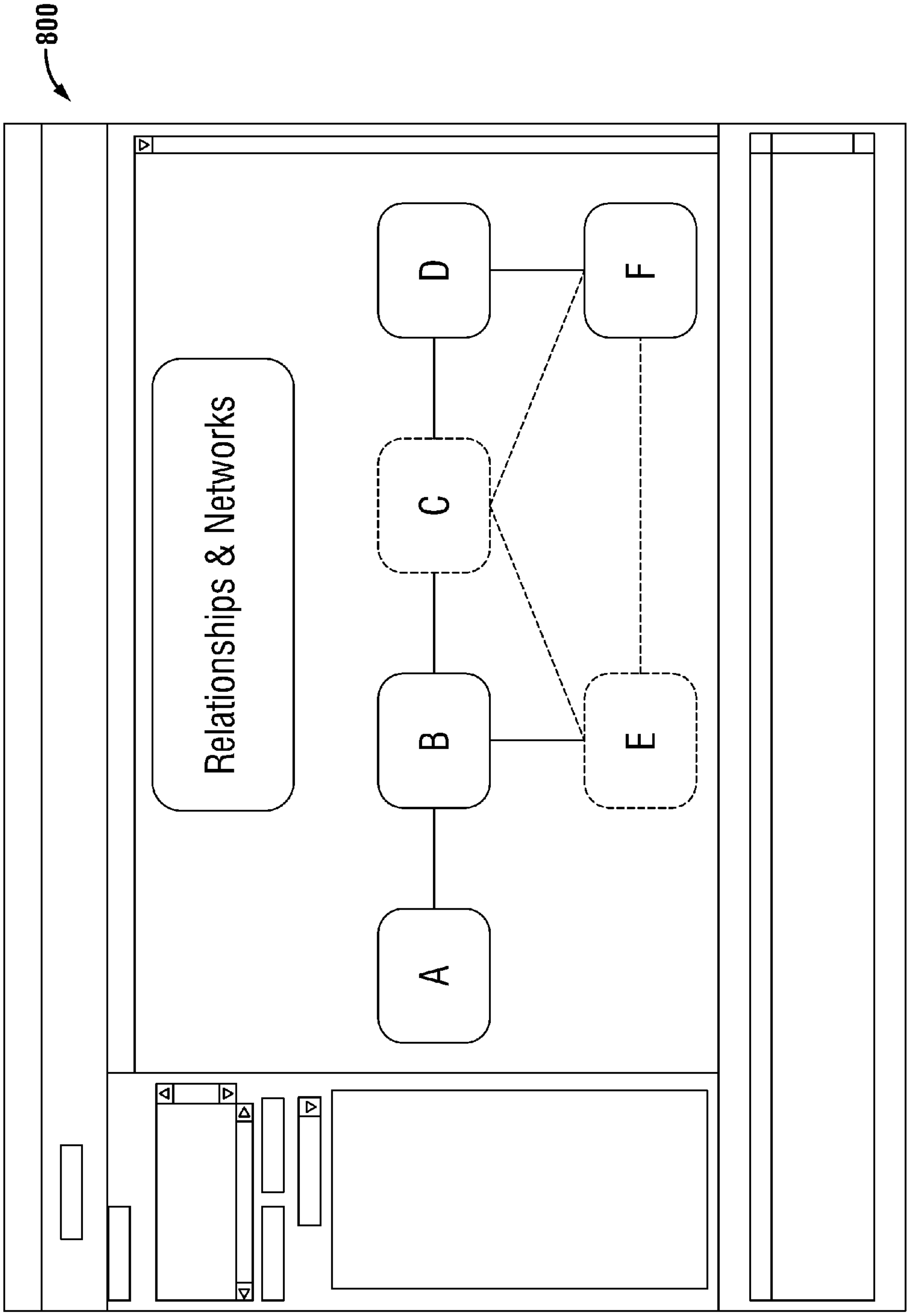

Embodiments also include an interactive user interface for results visualization and input from the user using input devices such as a keyboard or a mouse. In an embodiment, the user interface would permit the analyst to visualize Identifiers and Links, the mappings of Identifiers to Entities, the INT-specific Graphs, and the fused Graph. For example, the user interface can display a fused Graph reflecting a specific mapping of Identifiers to Entities, and a fused Graph in which the edges have been collapsed into a single Link. In an embodiment, the user interface would further permit the analyst to set configuration parameters for optimization function 1200 (described below). In an embodiment, the user interface would permit the analyst to assert that particular Identifiers map to particular Entities, and run the automated algorithms to optimize a solution that includes those asserted mappings. In an embodiment, the user interface permits the analyst to select one or more behavior models. FIGS. 7 and 8 depict exemplary GUIs for visualizing identified mappings and resulting relationship networks. Lynxeon Analyst Studio™, commercially available from 21CT, Inc. is an example of an interactive user interface that can provide this functionality. The interactive user interface is not required for the invention; some embodiments do not require this interface.

Cross-INT Entity Resolution as an Optimization

Cross-INT entity resolution can be formulated as an optimization problem. Aspects of an exemplary embodiment of the optimization problem are as follows.

Each different INT modality provides a set of Identifiers and Links in a link-oriented dataset, represented in an embodiment as a Graph. The mapping of Identifiers (which are specific to a single INT) to Entities (which cross INTs) is unknown. Each Identifier is represented as a separate node in the uni-INT graphs. Each Identifier has a set of INT-dependent attributes.

Each INT gives a graph $G_i$ with nodes for Identifiers $n_{i1} \ldots n_{ij}$ and edges $\{E_i\}$ for Links. FIG. 9 shows a collection of graph data 900 based on different collection modalities:

| | |
|---|---|
| IMINT: | $n_{11}, n_{12}, n_{13}, \ldots, n_{1k}$ |
| SIGACT: | $n_{21}, n_{22}, n_{23}, \ldots, n_{2j}$ |
| . . . | . . . |
| DNE: | $n_{m1}, n_{m2}, n_{m3}, \ldots, n_{mp}$ |

$$G_i=(N_i,E_i)N_i=\{n_{i1}, n_{i2}, \ldots, n_{ij}\}$$

The solution space being searched is the set of all possible mappings from Identifiers to Entities. This is a many-to-one mapping. Often there will be one Identifier per Entity in each INT. When an Entity is not represented in an INT, it will have zero Identifiers. Alternatively, an Entity may have multiple Identifiers in a single INT; imperfect entity resolution within SIGACTs and users of multiple mobile devices within COMINT are examples. The system and method can handle all of these cases. A solution X is a set of mappings from Identifiers (n's) to Entities (x's). Identifiers that are not matched to other Identifiers constitute their own degenerate Entities.

A solution X is a set of Identifier groupings $x_1 \ldots x_q$ (one grouping per Entity). The presence of an Identifier in the grouping for a particular Entity indicates that the Identifier has been mapped to that Entity. All Identifiers that co-exist within a grouping are considered Associated Identifiers. An exemplary solution X is illustrated in FIG. 10:

$$X_1 = (n_{11}, n_{27}, n_{34})_{P=0.7},$$
$$X_2 = (n_{12}, n_{33})_{P=0.9},$$
$$X_3 = (n_{23}, n_{41}, n_{42})_{P=0.5}, \ldots$$

In an embodiment, each grouping may be associated with a confidence level, as indicated by the subscript probabilities in FIG. 10.

As shown in step 2030 of FIG. 20, each solution X induces a fused multi-INT Graph G in which each Entity is a single node and that node's edges comprise all Links for any Identifier that was mapped to the Entity. The set of all edges in G is thus the union of all edges (Links) from each single-INT Graph, structured according to the mapping X.

The fused Graph is G where nodes are Entities $x_1 \ldots x_q$; and edges are union of $E_i$ given set of groupings X. As shown in FIG. 11:

$$G = \left(X, \left(\bigcup_{i=1 \ldots m} E_i; X\right)\right)$$

As shown in step 2040 of FIG. 20, each solution X is evaluated by evaluating the graph G that it induces with a weighted multi-term objective function. In an embodiment, the objective function represents considerations found in preferred mappings, for example: the attributes of the matched Identifiers should be compatible; the Link structure should exhibit high mutual information across INTs; and the fused Link structure should fit established models of expected interaction patterns.

Embodiments use a combination of three terms in an objective function to evaluate each solution X:

AF: Matched Identifier attribute compatibility

MI: Cross-INT Link mutual information

MF: Fused Graph compatibility with interaction models

An exemplary objective function 1200 over the solution X is represented in the equation shown in FIG. 12:

$$\mathrm{Fit}(X; E_i, \ldots, E_m) = \alpha \cdot \sum_{i=1 \ldots m} AF(X_i) + \beta \cdot MI(E_1, \ldots, E_m; X) + \gamma \cdot MF\left(\bigcup_{i=1 \ldots m} E_i; X\right)$$

The α, β and γ factors in objective function 1200, are constants that reflect a relative weighting of the three components 1210, 1220, and 1230 of objective function 1200. The user can modify the weightings to emphasize different perspectives of the interaction data. An exemplary weighting will define each of α, β and γ equal to 33.3%. Alternatively, any of α, β or γ can be set to zero (0%) to remove that factor from the objective function.

Finding the optimal solution for a particular objective function is a combinatoric optimization problem familiar to those of ordinary skill in the art; existing heuristic approaches to combinatoric optimization apply. An initial approach in an embodiment preferably uses a meta-heuristic approach such as a genetic algorithms or simulated annealing. Heuristic optimization approaches can be used to build effective and scalable graph theoretic optimization approaches. Alternative embodiments may employ other optimization algorithms (e.g., convex optimization) that may provide other convergence guarantees, runtimes, and/or characteristic results.

Addressing cross-INT entity resolution as a combinatoric optimization allows for joint effects to inform individual Identifier-to-Entity mappings. For example, accepting a slightly lower-quality name match (when names are relevant) may result in a much more coherent Link structure and one that may better match expected behavioral patterns, which is also indicative of having found a preferred mapping. Considering Link structure and the correlations of multi-INT Links during the fusion process provides significant advantages over existing approaches.

In embodiments, using tools and techniques known to those of ordinary skill in the art, all data and "conclusions" (e.g., the many-to-one mapping of Identifiers to Entities) may be associated with reliabilities or confidence evaluations ranging continuously from 0.0 to 1.0. Inference (including specifically the collapsing of Links between Entities into Relationships) is performed, in an embodiment, using probabilistic methods such as Markov Logic Networks or Fuzzy Logic that address this type of scenario directly. Even when operating on input data with severe limitations, some inferences (however weak) can be provided. In these cases, early stages of the workflow will rely more heavily on analyst assertions. Once the analyst asserts enough mappings to provide an initial structure for the optimization to build off of, more mappings will be automatically computed. In an extended approach that refines the mapping over time based on new information, an embodiment may also incorporate the use of Dynamic Bayesian Networks or similar techniques.

Term 1: Identifier Attribute Compatibility

The objective function strongly shapes the results of the optimization. Turning to FIG. 12, the first term 1210 in the exemplary objective function 1200 measures the compatibility between the attributes of Identifiers that are mapped to each Entity (i.e., Associated Identifiers). Preferred mappings of Identifiers to Entities will yield, for all Entities, high attribute compatibility among its set of Associated Identifiers.

As an example, if two or more Identifiers have a name attribute, an embodiment seeks mappings which associate Identifiers with names that are similar phonetically. For example the association {"Sean", "Shawn", "Shaun"} would be preferable to the association {"Larry", "Curly", "Moe"}. An embodiment defines the value AF in term 1210 based on the well-known Jaro-Winkler distance for name comparisons, which is defined as $$d_w = d_j + (lp(1 - d_j)),$$

where $d_w$ is the Jaro-Winkler distance, $d_j$ is the Jaro distance for the two strings being compared, 1 is the length of the common starting prefix, and p is a constant scaling factor which is often set to 0.1. In an embodiment, value AF in term 1210 can be set to 1.0 minus the average value of $d_w$ for all pairwise comparisons of Identifiers associated with each Entity. Thus, optimizing objective function 1200 would tend to generate mappings in which Associated Identifiers are phonetically similar.

If two or more Identifiers have demographic and/or physical attributes, an embodiment seeks mappings that minimize the differences between those attributes. For example, the association {"35 years old, 6 feet tall, 200 pounds", "35 years old, 6 feet 2 inches tall, 190 pounds"} would be preferable to the association {"35 years old, 6 feet tall, 200 pounds", "70 years old, 5 feet 6 inches tall, 150 pounds"}. An embodiment would compute the differences in each attribute, scale each difference by a constant, and sum the scaled differences. Thus, optimizing objective function 1200 would tend to generate mappings in which Associated Identifiers have similar demographic attributes.

If two or more Identifiers have spatio-temporal localizations, an embodiment seeks mappings that minimize differences in distance and/or time between those attributes. For example, the association {"12:00 pm July 4 in Boston, Mass.", "2:00 pm July 4 in Cambridge, Mass."} would be preferable to the association {"12:00 pm July 4 in Boston, Mass.", "8:00 am June 10 in Berkeley, Calif."}. An embodiment would compute the spatial difference in miles and the temporal difference in hours, scale each difference by a constant, and sum the scaled differences. Thus, optimizing objective function 1200 would tend to generate mappings in which Associated Identifiers have similar spatio-temporal attributes.

Any semantic attribute shared by two or more Associated Identifiers can be measured for compatibility and contribute to the attribute compatibility measurement of term 1210. If Identifiers have multiple attributes (e.g., both name and demographic attributes), then in an embodiment, the attribute similarity metrics described above would each be scaled by a constant and then summed to define the value AF in term 1210. In this way, similarities between multiple attributes can be considered simultaneously. Further, the attribute compatibility of one set of Identifiers is independent of how other identifiers are arranged into sets. Thus, in term 1210, Identifier attribute compatibility is computed Entity by Entity (i.e., Identifier set by Identifier set) and summed.

In an embodiment, external reference sources, whether perfect or imperfect, can be leveraged to help measure attribute compatibility. Exemplary reference sources include census data, telephone books, telephone number data, Internet Protocol (IP) address maps, and associations between mobile hardware, device, and user identifiers. For example, given a HUMINT Identifier with attribute "wealthy male" and a COMINT Identifier owned by "John Smith of 123 Main Street, Beverly Hills, Calif.", census reference data could associate the location Beverly Hills, Calif. with a median household income of $250,000, with the qualitative attribute "wealthy" to allow attribute comparison. Alternative embodiments could use other reference sources in similar ways.

Term 2: Maximum Mutual Information Across INTs

The second term 1220 in the exemplary objective function 1200 in an embodiment seeks to maximize the mutual information (MI) measured in the Links across INTs. Preferred mappings of Identifiers to Entities will yield high mutual information in links across INT. Mutual Information is defined in probability theory to measure the mutual dependence between two random variables, or equivalently, the ability of one random variable to accurately predict the other. Term 1220 is formulated to apply the principles of mutual information when measuring the compatibility of Link structure across INTs for a given mapping.

In an embodiment, term 1220 evaluates the mutual information between two single-INT graphs, $G_1$ and $G_2$, as follows. For each Identifier n, define S(n) as the Entity to which n is mapped in the mapping X. Copy graphs $G_1$ and $G_2$ without modification into working copies $WG_1$ and $WG_2$, respectively. In $WG_1$ and $WG_2$, replace each node representing an Identifier n with a node representing its Entity S(n), maintaining all edges between nodes. At this stage, $WG_1$ and $WG_2$ may each contain multiple nodes for some Entity, e. While any duplicate nodes exist for any e in $WG_1$ or $WG_2$, combine all the nodes representing each e; the combined node has the union of all edges from all duplicate nodes which were combined. After all duplicate nodes are eliminated, remove all duplicate edges and all edges whose starting and ending nodes are the same node (known as "self-edges"). Remove all nodes representing Entities that do not appear in both $WG_1$ and $WG_2$. In a manner known to those of skill in the art, compute the graph edit distance ED between $WG_1$ and $WG_2$. Divide ED by the sum of the number of edges in $G_1$ and $G_2$ to form the weighted graph edit distance WED. Define the mutual information as MI=(1.0−WED). This quantifies the commonality of Link structure between $G_1$ and $G_2$ given mapping X, in a single number that lies within the range 0.0 to 1.0. Thus, optimizing objective function 1200 using this formulation for term 1220 would tend to generate mappings in which Link structure is compatible across INTs.

Alternative embodiments may formulate term 1220 in many different ways. An alternative embodiment will not remove all nodes representing Entities that do not appear in both $WG_1$ and $WG_2$. Another alternative embodiment will not remove duplicate edges, but will instead represent duplicate counts as weights on the edges and compute a weighted edit distance. Another alternative embodiment will consider node additions or removals when computing edit distance ED. The alternative embodiments described here are exemplary only and do not limit the claimed invention.

The method of evaluating mutual information described immediately above is an embodiment that considers exactly two random variables (corresponding to $G_1$ and $G_2$ in this application). Other metrics can be used for evaluate mutual information between more than two random variables. Such exemplary metrics include total correlation and interaction information.

In an embodiment, terms 1210 and 1220 in exemplary objective function 1200 seek to maximize compatibility. The use of term 1220 is novel in that it applies this concept to Link structure when performing entity resolution. As previously discussed, term 1210 in an embodiment describes how the approach seeks maximal compatibility among the attributes of Identifiers that are mapped to the same Entity. Seeking "maximal compatibility" can also be described as seeking maximal redundancy, minimum novelty, minimum innovation (in the sense of Kalman filtering), and importantly, as maximum mutual information between the attributes. The same maximum mutual information criterion is used, in an embodiment, by term 1220 to measure the quality of cross-INT Link correlations that are induced by an Identifier-to-Entity mapping. Unlike attribute compatibility, the exemplary objective function does not compute mutual information locally for each node and then sum the results. Instead the mutual information term represents the global Link structure.

The representation of global Link structure in term 1220 models the effects of one Identifier-to-Entity mapping on the quality of other mappings (called "joint effects"). In an embodiment, joint effects can thus inform each individual mapping. This improves entity resolution accuracy, in an analogous way as to how the use of language model improves speech recognition performance beyond what is possible by considering each word in isolation. Established characteristics of human activity (e.g., preferential linking, homophily, and the horizon of observability) make these joint effects "regional" in nature in Graphs representing that human activity. While the effects of each mapping go beyond being "local", they are still limited in breadth. A particular mapping has little effect on distant (in the Graph) mappings.

Seeking maximum MI globally still allows individual INTs to contribute significant novel information locally. For each individual entity, the fused graph provides significant added knowledge over the data in a single INT. Consider, for example, the pair of exemplary mappings 1310 and 1320 in FIG. 13. In each mapping, the letters A-F denote Identifiers from one INT, and the numbers 1-5 denote Identifiers from another INT. Each mapping 1310 and 1320 reflects a mapping of Identifiers to Entities. In mapping 1310, Identifiers A and 1 are mapped to a single entity, as are Identifiers, B and 2, C and 3, D and 4, and E and 5. Mapping 1320 reflects a different mapping of Identifiers to Entities, one in which Identifiers A, B, C, D and E are paired with 1, 3, 5, 2 and 4, respectively. Comparing the mutual information between these two mappings, mapping 1310 will be preferred. In the preferred mapping 1310, the numbered data from one INT still contributes a novel link (i.e., between the Entities with Identifier 4 and Identifier.

Figure 13:
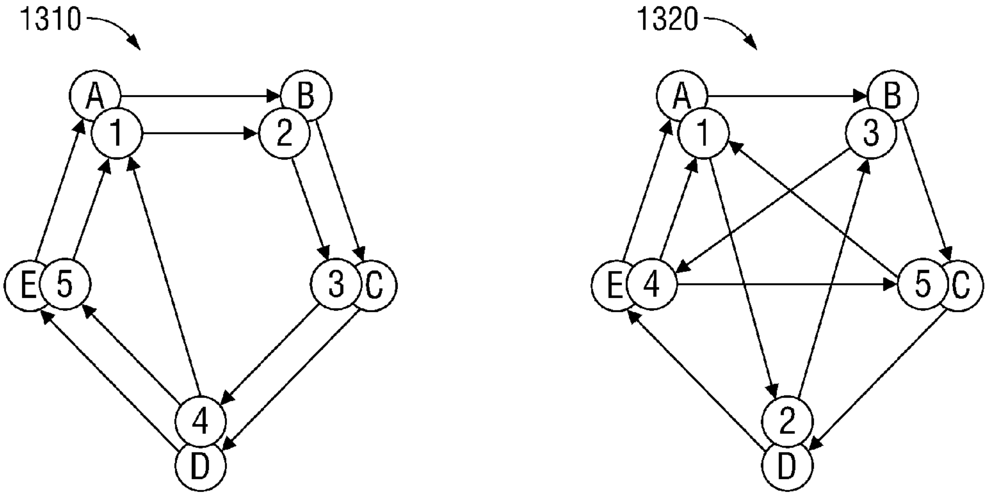
FIGS. 13 and 14 depict examples of good mappings and bad mappings.
Figure 14:
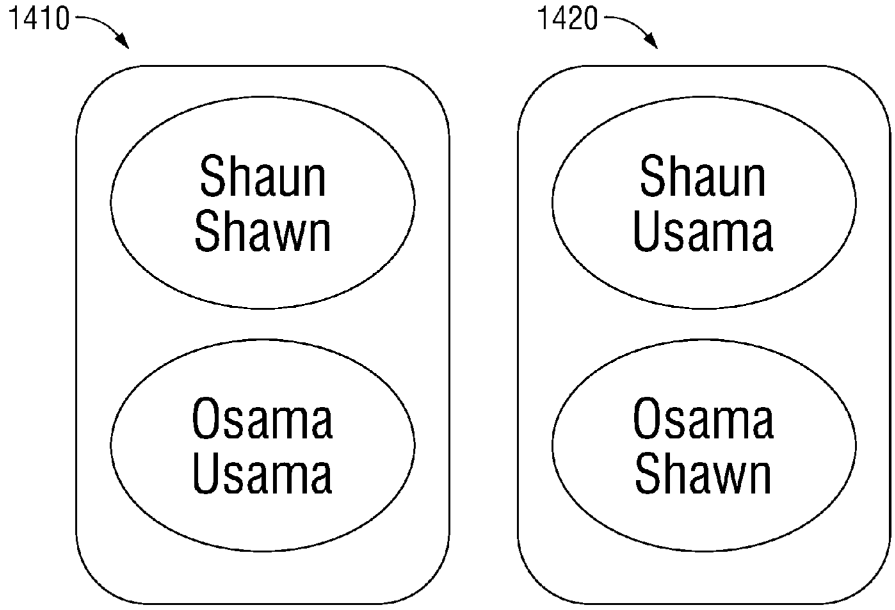

Optimizing towards maximum MI prevents solutions that result in a less coherent link structure (such as shown in an exemplary bad map 1320 in FIG. 13), which is both not preferred and unlikely to accurately reflect the observed human activity. FIG. 14 depicts another example of a preferred mapping (1410) as opposed to a non-preferred mapping (1420), but illustrated by attribute compatibility (1410) and incompatibility (1420). Juxtaposed, FIG. 13 and FIG. 14 illustrate the conceptual similarity between applying MI to Link structure compatibility (FIG. 13) and applying it to attribute compatibility (FIG. 14).

The use of mutual information within an optimization framework has several advantages over collective entity resolution (CER), an alternative method of using Graph elements to perform fusion.

CER methods consider the count of common neighbors between two Identifiers when performing fusion. Such an approach exploits local Graph structure in a limited way but ignores the regional and global structure captured by term 1220. Other CER methods may consider the count of common indirect neighbors; this is still less expressive than term 1220 because it fails to capture the compatibility or incompatibility in the Link structure among those neighbors. Their Link information could be wildly inconsistent between modalities, but the mapping would still receive a favorable rating by CER methods. In contrast, embodiments of the invention allow differentiation between solutions that exhibit globally compatible Link structure across modalities, and those that do not.

The use of an optimization framework also has specific advantages over CER methods. CER methods map Identifiers to Entities in an incremental clustering algorithm using a Greedy search heuristic; Identifier-to-Entity mappings are made one-by-one in a series of locally optimal (but not globally optimal) decisions. This search heuristic may produce suboptimal solutions for problems exhibiting local minima and/or local maxima; fusion of multi-modal interaction data has been determined to be one such problem. In contrast, embodiments of the invention compute all mappings simultaneously using global optimization algorithms. This provides superior fusion results.

Published CER methods are designed to address a different problem than the invention. They are focused on entity resolution in single-modality data such as academic co-reference databases, where Identifiers are typically not unique within a modality—e.g., the Identifier "T. Coffman" could be shared by multiple Entities named Thayne Coffman, Tim Coffman, Tom Coffman, etc. CER methods emphasize abstract single-modality data (e.g., academic co-references) with possibly multiple Identifiers per Entity, and possibly multiple Entities per Identifier. Further, CER methods assume that each Identifier can participate in at most one transaction. The invention, in contrast, accommodates multi-modality data (e.g., transactional human interactions or communications in multiple domains) with possibly multiple Identifiers per Entity, but at most one Entity per Identifier in each collection of interaction data, and with each Identifier able to participate in one or many transactions. This allows an improved use of the Link structure to inform entity resolution, which is captured by terms 1220 and 1230 in objective function 1200. Term 1220 captures the compatibility of Link structure across INTs for a given mapping, and term 1230 (described below) captures the compatibility of the fused Multi-INT Link structure with established behavioral models.

Term 3: Fit of Fused Links to Behavior Models

In addition to consistency across Identifier attributes and consistency across multi-INT Link behavior, preferable Identifier-to-Entity mappings may result in fused Graphs that fit established behavior models for human interactions, and embodiments will search for mappings that exhibit a good fit. For a particular fusion scenario, the system designer can select an appropriate set of behavior models to leverage. Technical metrics can then be created to measure the fit of observed Links to those models. The third term 1230 of the exemplary objective function 1200 measures the fit of fused Links to the selected behavior models. The invention uses these behavior models to improve the quality of the Identifier-to-Entity mappings.

A wide variety of behavior models can be defined, each with associated metrics that quantify the fit of the fused multi-INT graph to the models, and in different embodiments these form part or all of term 1230. These models include generic multi-INT correlation models, generic social structure models, role-specific models, task-specific models, and event-specific models. Various embodiments will apply different models or combinations of models, and thus those embodiments will define the details of term 1230 in different ways. In an embodiment, one or more models accepts parameters, such that measuring the fit of the fused multi-INT graph to the model also includes the process of automatically identifying the model parameter that maximizes the measured fit. In an embodiment, one or more models allows flexible assignment of entities to model actors, such that measuring the fit of the fused multi-INT graph to the model also includes the process of automatically identifying the assignment that maximizes the measured fit. In an embodiment, multiple models are used that accept parameters and/or allow flexible assignment, such that measuring the fit of the graph to the model includes automatically identifying both parameters and assignments that maximize the measured fit. The models and formulations discussed below are exemplary and do not limit the claimed invention.

Figures 15, 16:
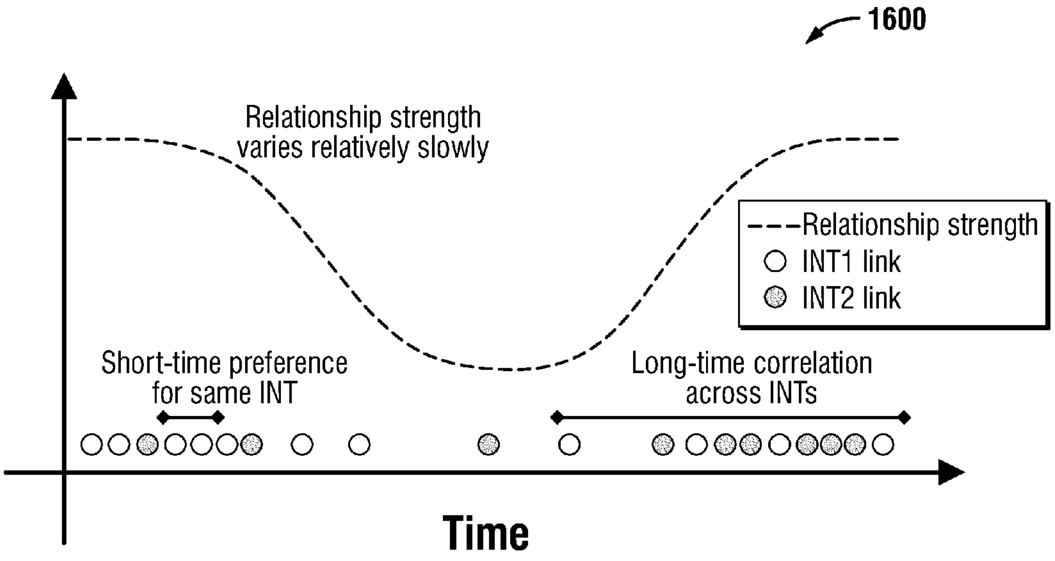
FIG. 15 provides an exemplary comparison of attributes of good mappings and bad mappings.
FIG. 16 illustrates exemplary general multi-INT correlation patterns in an embodiment.

Generic multi-INT correlation models apply broadly across many scenarios. In a first exemplary generic multi-INT correlation model, also known as a multi-modality correlation model, within small time periods, two interacting Entities prefer to communicate in one modality (e.g., cell phone, email, or face-to-face); communicating in that modality reduces the likelihood of their communicating soon after in another modality. In the same exemplary model, over longer time periods, Entities interacting in one modality are more likely to interact with each other using a different modality than they are to interact with other randomly-selected entities. (This is an established property of human social behavior.) Thus, in the model, Entities show short-time aversion and long-time affinity across modalities. In a second exemplary generic multi-INT correlation model, social and psychological factors defining the strength of the Relationship between the Entities vary slowly. Thus, the rate of Link creation per unit time between two Identifiers also varies slowly. FIG. 16 depicts both of these exemplary general multi-INT correlation models together in an embodiment.

In an embodiment, the first exemplary generic multi-INT correlation model described above is represented in term 1230 as follows. Two durations are defined, short ($D_S$) and long ($D_L$). A time step is defined (TS) and the full duration of the multi-INT data is divided into multiple times t with separation TS. Short-term preference for a single modality is modeled as follows. For every time t and every pair of Entities (i,j), the "preferred modality" is selected as the modality in which they share the most Links in the time interval [t, t+DS]. The pair's short term preference at time t, STP(i,j,t), is defined as the ratio of Links observed between the Entities within the preferred modality in time interval [t, $t+D_S$] to all Links observed between the Entities in the same time interval. The entire mapping's short-term preference, STP(X), is defined as the average of STP(i,j,t) over all i, j, and t; this value lies on the range [0, 1]. Long-term friend preference across modalities for communicating with the same Entities is modeled as follows. For every time t and Entity i, the Entities "friends" are selected as the K Entities with whom it shares the most Links (in any modality) in the time interval [t, $t+D_S$], for some value of K. The "preferred modality" between every pair of entities is defined as before. The Entity's long term friend preference at time t, LTF(i,t), is defined as the ratio of Links observed between the Entity and its "friends" in non-preferred-modalities (all modalities except the preferred modality) in time interval [t, $t+D_L$] to all Links observed between the Entity and any others in non-preferred modalities in the same time interval. The entire mapping's long-term friend preference, LTF(X), is defined as the average of LTF(i,t) over all i and t; this value lies on the range [0, 1]. In an embodiment, the fit of the mapping to the exemplary generic multi-INT correlation model is defined as MF=STP(X)+LTF(X).

Human Relationship structures also exhibit other tendencies, referred to here as generic social structure models. For example, graphs of Entities and Relationships representing human social structure are known to be well represented by models known alternatively as scale-free models, power law models, or small world models. A power law is a mathematical relationship between two quantities such that the frequency of an event varies with the power (e.g., exponent) of some attribute of the event. As an exemplary generic social structure model, the number of acquaintances with which a person has at least K interactions is found to vary as a power of the threshold number of interactions K. Graphs representing these persons and interactions as Entities (or Identifiers) and Links will be well represented by power law models. Alternative embodiments may incorporate other relevant a priori statistical models.

In an embodiment, the exemplary power law social structure model is represented in term 1230 as follows. A power law distribution for the number of Links per Entity is defined as $p(x)=Cx^{-r}$, where C and r are constants, x is a number of Links, and p(x) is the probability of any particular Entity having x Links. The MF value in term 1230 is computed in two steps. First, for a mapping X, compute the values of C and r that best fit the link structure of the fused multi-INT graph induced by X. In an embodiment, this is done by computing a histogram of node degrees, computing the natural log of both axes, and selecting the best-fit line to the resulting data using least-squares regression. The slope of the line is negative r and its y-intercept is the natural log of C. Second, compute the goodness of fit between the distribution given by C and r and the fused multi-INT graph. Goodness of fit is a known statistical measure; it is computed from the coefficient of determination, $$R^2 = 1\frac{SS_{err}}{SS_{tot}} R^2 = 1 - \frac{SS_{err}}{SS_{tot}},$$

where $SS_{err}=\Sigma(y_i-f_i)^2$, $SS_{tot}=\Sigma(y_i-\bar{y})^2$, $y_i$ is the log-scaled value of p(x), $\bar{y}$ is the mean of the $y_i$, and $f_i$ is the value given by the regression line computed above. The value of $R^2$ lies on the range [0, 1]. In an embodiment, term 1230 is defined using $MF=R^2$.

Behavior models can be defined for a particular social role or Persona; we call these role-specific models. The sociology and social network analysis (SNA) research communities have defined multiple such roles. One exemplary role is that of a "bridge," who provides a social tie that connects two different groups in a social network; this role is also sometimes called either "gatekeeper" or "courier." Another exemplary role is that of an "isolate," who does not actively participate in cliques or friendship groups. Other role-based behavior models are specific to a particular data set or scenario. Alternative embodiments may select from a notional library of candidate roles and Personas against which fused Link behavior is compared. As with Relationship strength, the role(s) or Persona(s) of an Entity tend to change slowly; they should remain consistent across INTs and across time.

In an embodiment, the "bridge" role-specific model is represented in term 1230 as follows. The SNA metric "betweenness centrality" (BC(n)) measures the number of shortest paths from all nodes to all others that pass through a given node. The SNA metric "degree" (D(n)) measures the number of edges for a given node. The SNA metric "local clustering coefficient" (LCC(n)) measures the similarity of a particular node's neighbors to a clique. Entities following a "bridge" model are expected to exhibit a high betweenness centrality, low degree, and low local clustering coefficient. In an embodiment, a node's fit to the "bridge" model (MFB(n)) can be represented as MFB(n)=BC(n)/(D(n)+LCC(n)). The MFB (n) value lies on the range [0, 1], and in an embodiment the value MF can be defined as the average of MFB(n) for all nodes expected to follow the "bridge" model. In an alternative embodiment, an analogous formulation measures fit to the "isolate" model, which is characterized by low betweenness centrality and low degree. Alternative embodiments will formulate still other role-specific models as analogous quantities computed over SNA metrics.

Figure 17:
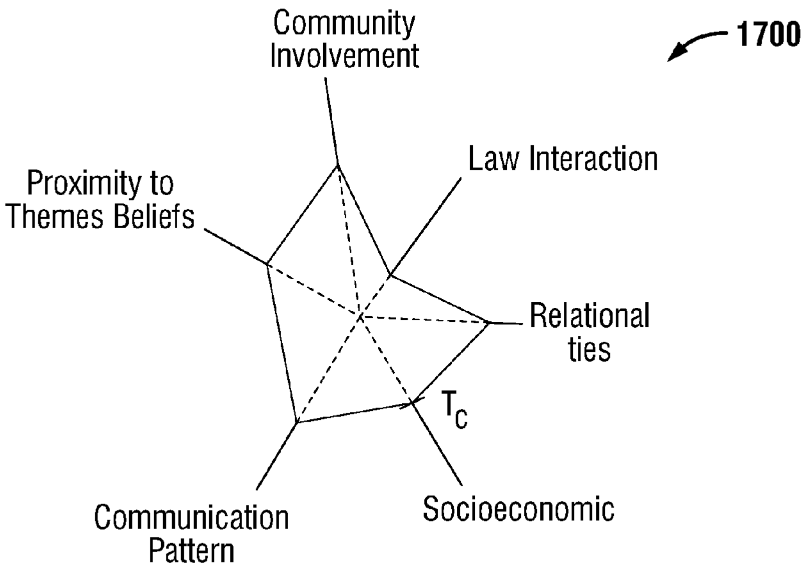
FIG. 17 illustrates an exemplary Persona model in an embodiment.

FIG. 17 illustrates an exemplary Persona model such as can be represented in term 1230 in an embodiment. The Persona model is comprised of a plurality of behavior attributes. Exemplary attributes include strength of community involvement, legality of interactions, strength of relational ties, socioeconomic status, etc. Attributes are shown as (non-orthogonal) axes emanating from the center of FIG. 17, and the Persona's expected value along each axis is indicated by the shape at the center of FIG. 17. Each attribute is defined and quantified using a different combination of SNA metrics, in an analogous fashion to the definition of the "bridge" role above which was defined by MFB(n). A Persona is defined as a set of attributes and expected values for each attribute. The fit of an Entity to a Persona model is quantified as the distance between its observed attribute values and the Persona model's expected attribute values, using established distance metrics such as the Euclidean, Manhattan, or Mahalanobis distances.

Figure 19:
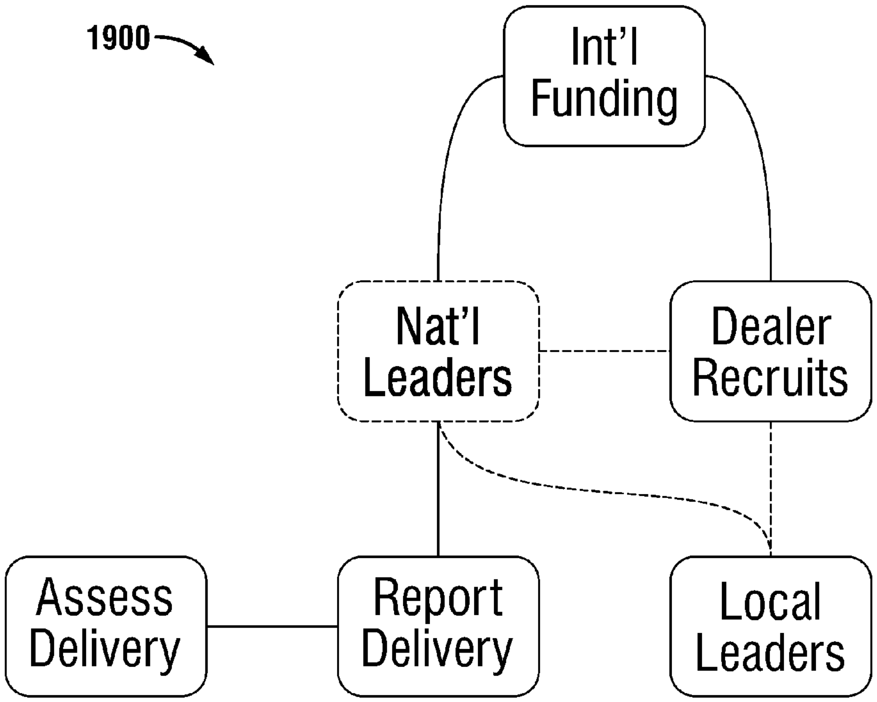
FIG. 19 depicts an exemplary behavior model based on execution of a collaborative task.

A task-specific model is a behavior model that is defined for a particular collaborative task. FIG. 19 depicts an exemplary model based on execution of the task of smuggling drugs into the United States. In the exemplary model, different individuals play different task-specific roles (e.g., "dealer", "national leader", "local leader"), and those roles heavily shape expected communication behavior. In an embodiment, if a particular Entity's task-specific role is known, these behavior expectations can contribute to measuring the quality of a proposed Identifier-to-Entity mapping.

In an embodiment, the "local leader" task-specific model depicted in FIG. 19 is represented in term 1230 as follows. In an embodiment, the local leader is expected to first communicate with the recruiter, then with the national leader to receive instructions, and finally with the national leader to report results. In the embodiment, the local leader is further expected to minimize other communications to avoid detection. Three time periods can be defined corresponding to the local leader's expected Links. In the first period, the model has bidirectional Links with the recruiter. In the second period, the model has incoming Links from the national leader. In the third period, the model has outgoing Links to the national leader. In all periods, the model has no other Links. For each time period Links are counted that match the model and the links that do not match the model for a particular Entity that is expected to follow the local leader model are counted. The ratio of matching to non-matching Links in each period is computed, and finally the average ratio across the three periods. Through an automated search algorithm, the time period boundaries that maximize that average ratio can be identified. In an embodiment, the value MF in term 1230 for an Entity expected to follow the local leader model is defined to be the maximum average ratio.

"Event-specific models" are behavior models that are defined explicitly or implicitly for a specific event. In an embodiment, an explicit event-specific model is defined by analyzing and modeling Entity reactions to past events. The fit to this explicit model is measured as the degree to which observed behavior surrounding the event is similar to past behavior surrounding similar events. In an embodiment, an implicit event-specific model is defined by analyzing and modeling collective Entity reactions to the current event, and characterizing the normal collective reactions to the event. The fit to this implicit model is measured as the degree to which the Entity reactions to the event are similar.

Figure 18:
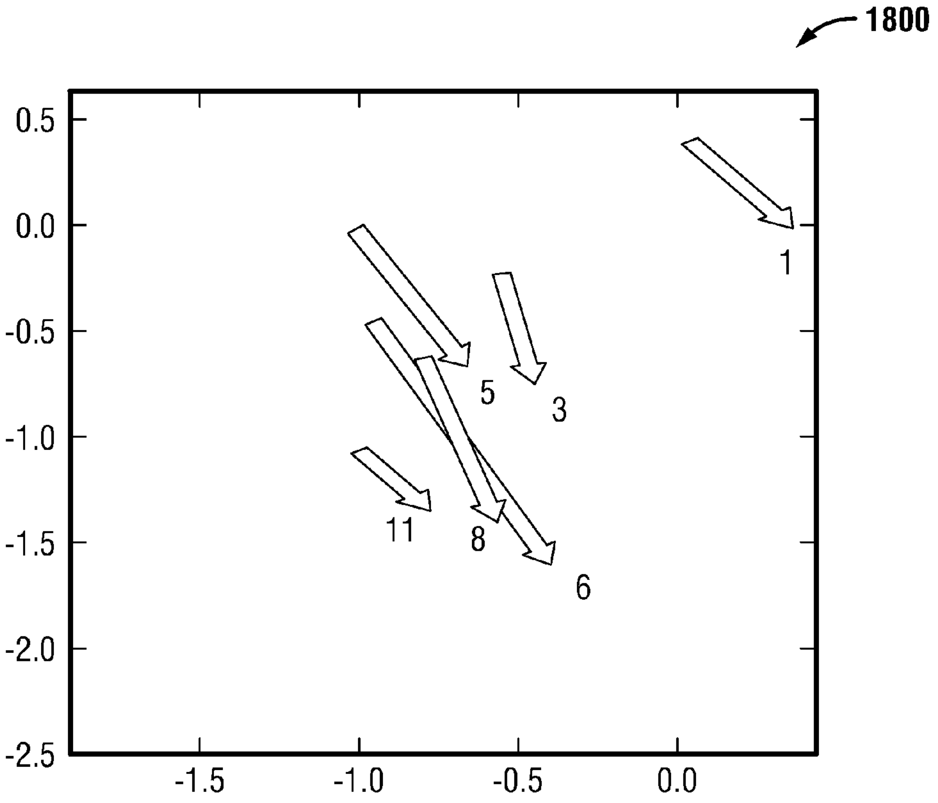
FIG. 18 illustrates an exemplary behavior model based on responses to recent events.

In an embodiment, the similarity to an implicit event-specific model is computed as follows. FIG. 18 illustrates an exemplary event-specific model based on responses to recent events in an embodiment. In the exemplary model, for a fused multi-INT graph and known event time, a plurality of SNA metrics are computed for the Entities for time periods immediately preceding and immediately following the event. The most significant variations of those SNA metrics are automatically computed using the known technique of principal components analysis; these define the x- and y-axes in FIG. 18. The expected behavior change (EBC) is defined as the difference between the mean principal component values after the event and the mean principal component values before the event, and the magnitude of the expected behavior change (MEBC) is computed. In FIG. 18, each arrow depicts the difference in a single Entity's principle component values before and after the event. In FIG. 18, the average length of the pictured arrows corresponds to the MEBC. For each Entity the deviation from the EBC is computed as a vector by subtracting the EBC from the specific Entity's change in principal component values, and is called the deviation from expected behavior (DEB). The average magnitude of the DEB vectors is then computed, and is named the average deviation from expected behavior (ADEB). In an embodiment, the value MF in term 1230 is defined as MF=(1.0−(ADEB/MEBC)).

The general success of past social network analysis (SNA) technologies strongly suggests the existence of behavior models that are applicable, useful, and general. If this structure in behavior did not exist, Entities' interactions would be unguided and the result would be fused Link graphs that appeared "random" instead of following consistent models of collective or individual behavior such as power law behavior, established social roles, or other models. Similarly, SNA metrics and SNA itself would lack any predictive or explanatory value and would be largely useless. All of these facts imply that Entities' interactions will be model-based, regardless of INT. In an embodiment, these models may be built automatically by machine learning algorithms. In alternative embodiments, the models may be built from expert human knowledge. Since the structure exists and can be modeled, the invention can leverage it by incorporating it into term 1230 of equation 1200.

In an embodiment, multiple models contribute to the MF value in term 1230. In an embodiment, the quality of fit to these models can be combined by scaling each and summing them. In alternative embodiments, a variety of different statistics may be used to combine the contributions of each model to the MF value, including the average quality, median quality, minimum quality, or other statistics. All of the models described above as contributing to term 1230 are exemplary only and do not limit the claimed invention.

Exemplary Embodiment in a Computer System

Figure 1:
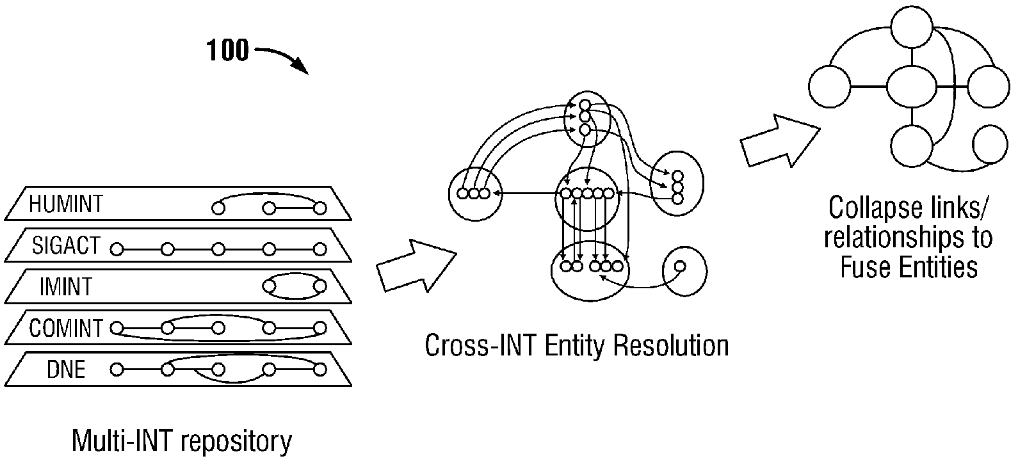
FIG. 1 depicts generally the steps of an exemplary method of fusing multi-modal interaction data.
Figure 2:
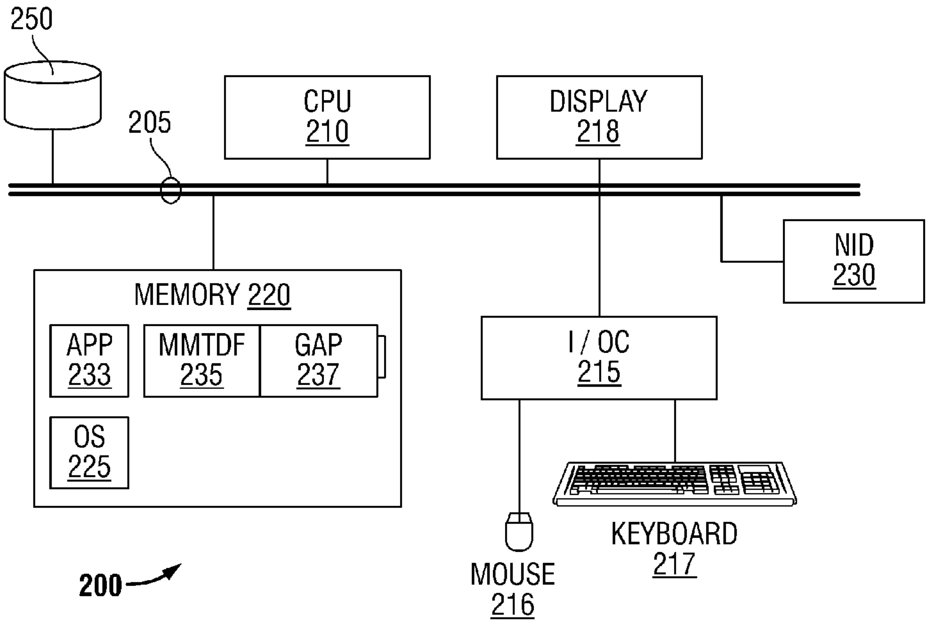
FIG. 2 depicts generally an exemplary computer system for use in an embodiment of a method for fusing multi-modal interaction data.

FIG. 2 is a block diagram representation of an exemplary computer system, which implements embodiments of the invention as described herein and is identified here as a Multi-Modal Transactional Data Fusion System (MMTDF) 200.

Referring now to FIG. 2, there is depicted a block diagram representation of a data processing system that may be utilized as an MMTDF System 200, in accordance with an illustrative embodiment of the present invention. The MMTDF System 200 may include one or more central processing units (CPU) 210 connected to memory 220 via system interconnect/bus 205. Also connected to system bus 205 is I/O bus controller 215, which provides connectivity and control for input devices, mouse 216 and keyboard 217, and output device, display 218. Also connected to system bus 205 is a data store 250. Data store 250 can include a hard disk or any other form of persistent storage medium know to those of skill in the art operative to store the Graph data structures and other data used by the MMTDF System 200, including but not limited to Graph Analytics Platform 237.

The MMTDF System 200 further comprises one or more network interface devices (NID) 230 by which MMTDF System 200 communicates/links to a network and/or remote computers (which may be hosts, clients or servers) 132 . . . 138 (not shown). NID may comprise modem and/or network adapter, for example, depending on the type of connection to the network. MMTDF System 200 comprises a data store (unnumbered) for persistent storage of the Graph data structures and other data used by the MMTDF System 200, including but not limited to Graph Analytics Platform 237 and multi-INT repository 300. The data store may be stored on one or more remote computers 132 . . . 138 (not shown), or may be stored, in whole or in part, in local data store 250 connected to system bus 205. Local data store 250 may be any other form of persistent storage known to those of ordinary skill in the art, including but not limited to RAM, RAM drives, USB drives, SD memory, disks, tapes, DVDs and CD-ROMs.

Those of ordinary skill in the art will appreciate that the hardware depicted in FIG. 2 is a basic illustration of a computer device and may vary from system to system. Thus, the depicted example is not meant to imply architectural limitations with respect to the present invention.

Those of ordinary skill in the art will also appreciate that the use of computer system hardware and software is essential to the invention. The complexity of the mathematical calculations involved, and the requirement to maintain and flexibly access vast quantities of information, both far outstrip the ability of any unaided human. The present invention would be impractical to the point of impossibility absent its embodiment in a computer system.

Notably, in addition to the above described hardware components of MMTDF System 200, various features of the invention are provided as software code stored within memory 220 or other storage (not shown) and fetched from memory and executed by CPU 210. Located within memory 220 and executed on CPU 210 are a number of software components, including operating system (OS) 225 (e.g., Microsoft Windows®, a trademark of Microsoft Corp, or GNU®/Linux®, registered trademarks of the Free Software Foundation and The Linux Mark Institute), and a plurality of software applications, of which MMTDF software 235 and Graph Analytics Platform 237 are shown. In actual implementation, MMTDF software 235 and Graph Analytics Platform 237 may be added to an existing application server or other network device to provide the enhanced features within that device, as described below.

CPU 210 executes these (and other) application programs 233 as well as OS 225, which supports the application programs 233, MMTDF software 235 and Graph Analytics Platform 237. The software code instructions provided by MMTDF 235 include coded instructions for: (a) fusing Graphs containing Identifiers from INT sources, (b) resolving Identifiers to Entities, and (c) optimizing mappings of Identifiers to Entities.

In an embodiment, Graph Analytics Platform (GAP) 237 provides a graph analytics platform technology for using, viewing, manipulating and analyzing the data structures described herein. Preferably the graph analytics platform is implemented in software or coded instructions (which may include portions implemented in hardware) and stored in memory and fetched and executed by a processing unit. It is assumed that observable (or raw) data has been collected, and the graph analytics platform preferably stores or organizes the collected observable data in a form that is link-oriented, that is, data is organized as nodes and Links (or edges) between nodes. Exemplary link-oriented data sets include graphs and trees, and can be implemented with relational database technology such as a relational database management systems or object-oriented relational database management systems, and query language using methods well-known to those of ordinary skill in the art.

In an embodiment of GAP 237, nodes have types associated with them (e.g. People) and one or more attributes and Links are named (e.g. parentOf) and their end points are also typed (e.g. links of People). Attributes are named scalar value properties that express owned aspects of a given Node type (e.g., a person's name, a vehicle's model, or a phone call's duration). The features of the graph analytics platform are not dependent on the definition of any one data set, but can adapt to function against any data set that is or will be defined.

GAP 237 in an embodiment includes search and segment matching tools to search the data set efficiently and to match segments or patterns or identify nodes or links that meet specified criteria. Methods and techniques for searching and segment matching, including without limitation graph tools including sub-graph matching and relational database methods, are well-known to those of ordinary skill in the art. In an embodiment the link-oriented data set uses a strongly-typed node and link system, where every node is of an identifiable type such as 'Person' or 'Organization'. Links are typed and connected between identifying node types, such as 'Person memberOf Organization'. In an embodiment, links are typed but do not have attributes, which facilitates scalable, fast pattern matching. Preferably the graph analytics platform uses a strongly-typed link-oriented data, segment matching for data set searches, an efficient storage format and language and use of query languages for building queries, all as described in pending U.S. patent application Ser. No. 11/590,070 filed Oct. 30, 2006 entitled Segment Matching Search System and Method, hereby incorporated by reference. Also incorporated by reference for all that it discloses is PCT Patent Application No. PCT/US2008/086729, entitled A Method and System for Abstracting Information for Use In Link Analysis, International Publication Number WO2009/148473 A1 A graph analytics platform preferably also provides pattern search (including graph pattern matching), and management and application development (including client and server tools) functionality. An exemplary embodiment of a graph analytics platform is the Lynxeon Intelligence Analytics Enterprise product suite provided by 21CT, Inc.

For simplicity, the collective body of code that enables these various features is referred to herein as MMTDF Software. According to the illustrative embodiment, when CPU 210 executes OS 225, MMTDF Software 235, and GAP 237, CPU 210 performs the methods and functions described herein, including, in embodiments, representing a plurality of collections of intelligence or interaction data in a plurality of graphs or other link-oriented datasets, fusing the graphs or link-oriented data sets, identifying an optimal mapping of Identifiers to Entities in the plurality of collections of interaction or intelligence data, and collapsing edges or links between Entities.

Alternative embodiments may include additional servers, clients, and other devices not shown. The exact complexity of network devices may range from a single computer to a network comprising thousands or more interconnected devices. In the described embodiment, MMTDF System 200 is coupled to an intranet or a local area network (LAN). In more complex implementations, MMTDF System 200 may be, or may also be, coupled to a wide area network (WAN), such as the Internet and the network infrastructure may be represented as a global collection of smaller networks and gateways that utilize the Transmission Control Protocol/Internet Protocol (TCP/IP) suite of protocols to communicate with each other. Those of skill will recognize that the methods, processes, and techniques of the embodiments described herein may be implemented to advantage in a variety of sequential orders and that embodiments may be generally implemented in a physical medium, preferably magnetic or optical media such as RAM, RAM drives, USB drives, SD memory, disks, tapes, DVDs and CD-ROMs or other storage media, for introduction into a computer system described herein. In such cases, the media will contain program instructions embedded in the media that, when executed by one or more central processing units, will execute the steps and perform the methods, processes, and techniques described herein including fusing Graphs containing Identifiers from INT sources, resolving Identifiers to Entities, and, in embodiments, optimizing mappings of Identifiers to Entities.

The figures described herein are provided as examples within the illustrative embodiment(s), and are not to be construed as providing any architectural, structural or functional limitation on the present invention. The figures and descriptions accompanying them are to be given their broadest reading including any possible equivalents thereof.

While the invention has been particularly shown and described with reference to a preferred embodiment, it will be understood by those skilled in the art that various changes in form and detail may be made therein without departing from the spirit and scope of the invention.

What is claimed is:

1. A method for fusing intelligence data from multiple intelligence modalities comprising the steps of:

representing first intelligence data from a first intelligence modality in a first link-oriented dataset, said first intelligence data comprising one or more first identifiers specific to the first intelligence data, wherein "first identifier" means a moniker for an entity within the first intelligence data;

representing second intelligence data from a second intelligence modality in a second link-oriented dataset, said second intelligence data comprising one or more second identifiers specific to the second intelligence data, wherein "second identifier" means a moniker for an entity within the second intelligence data;

fusing the first link-oriented dataset and the second link-oriented dataset;

determining an optimal mapping of the first identifiers and the second identifiers to entities, said optimal mapping comprising a plurality of links between a first entity and a second entity, wherein determining an optimal mapping of the first identifiers and the second identifiers comprises creating two or more fused graphs, wherein each of the two or more fused graphs is associated with a different assignment of first identifiers and second identifiers to a plurality of entities, and evaluating the link structures of the two or more fused graphs, and wherein determining an optimal mapping of the first identifiers and the second identifiers further comprises evaluating the compatibility of one or more attributes of the first identifiers and second identifiers, the degree of mutual information between the one or more attributes, and the degree of correspondence with preexisting behavior models.

2. The method of claim 1 further comprising the step of collapsing the plurality of links between the first entity and the second entity to a relationship.

3. The method for fusing intelligence data from multiple intelligence modalities of claim 1 wherein the first link-oriented dataset and second link-oriented dataset are fused into a link-oriented dataset comprising a plurality of identifier nodes, wherein each of the first identifiers and second identifiers is associated with its own identifier node, and each identifier node has one or more identifier edges, and wherein creating a fused graph comprises assigning a plurality of fused identifiers to an entity, wherein each fused identifier is a first identifier or a second identifier, and collapsing the identifier nodes associated with each of the fused identifiers into an entity node associated with the entity, wherein the edges of the entity node comprise all edges of the identifier nodes associated with each of the fused identifiers.

4. The method for fusing intelligence data from multiple intelligence modalities of claim 1 wherein the optimal mapping comprises an assignment of one or more first identifiers and/or second identifiers to the first entity and an assignment of different one or more first identifiers and/or second identifiers to the second entity.

5. The method for fusing intelligence data from multiple intelligence modalities of claim 1 wherein evaluating the degree of mutual information between the one or more attributes further comprises measuring the commonality of link structure between the edges in each of the two or more fused graphs under a specific assignment of first identifiers and second identifiers to a plurality of entities.

6. The method for fusing intelligence data from multiple intelligence modalities of claim 1 wherein evaluating the degree of mutual information between the one or more attributes further comprises evaluating the graph edit distance between a plurality of the fused graphs under a specific assignment of first identifiers and second identifiers to a plurality of entities.

7. For use with a system comprising a computer-implemented graph analytics platform comprising a plurality of collections of interaction data collected from a plurality of interaction data sources, a method of fusing interaction data, comprising:

embodying a first collection of interaction data in a first interaction graph, the first collection comprising evidence of interactions between a plurality of first identifiers, wherein "first identifier" means a moniker for an entity in the first collection of interaction data, and the first interaction graph comprises a plurality of first identifier nodes, each first identifier node associated with one of the plurality of first identifiers, and a plurality of first edges between the first identifier nodes;

embodying a second collection of interaction data in a second interaction graph, the second collection comprising evidence of interactions between a plurality of second identifiers, wherein "second identifier" means a moniker for an entity in the second collection of interaction data, and the second interaction graph comprises a plurality of second identifier nodes, each second identifier node associated with one of the plurality of second identifiers, and a plurality of second edges between the second identifier nodes;

defining a plurality of entity mapping solutions, wherein each one of the plurality of entity mapping solutions comprises a mapping of the first identifiers and second identifiers to a plurality of entities;

associating with each one of the plurality of entity mapping solutions a fused interaction graph comprising a plurality of fused nodes and a plurality of aggregated edges, wherein each fused node is associated with a unique one of the plurality of entities in the entity mapping solution, and wherein, for each pair of fused nodes in the fused interaction graph, the aggregated edge between each member of the pair of fused nodes comprises all the edges between each identifier associated with the entities associated with each member of the pair of fused nodes; and identifying an optimal entity mapping solution out of the plurality of entity mapping solutions, wherein identifying the optimal entity mapping solution comprises using a computer system to evaluate, for each one of the plurality of entity mapping solutions, two or more of the following: compatibility of identifier attributes, mutual information across interaction data sources, and fit with one or more behavior models.

8. The method of fusing interaction data of claim 7, further comprising displaying the fused interaction graph associated with the optimal entity mapping solution.

9. The method of fusing interaction data of claim 7, further comprising, in the fused interaction graph corresponding to the optimal entity mapping solution, collapsing each aggregated edge between two fused nodes into a single fused edge.

10. The method of fusing interaction data of claim 7, further comprising displaying the fused interaction graph corresponding to the optimal entity mapping solution, wherein each aggregated edge between two fused nodes in the fused interaction graph is displayed as a single fused edge.

11. The method of fusing interaction data of claim 7, wherein the first collection comprises interaction data obtained from a first interaction modality and the second collection comprises interaction data obtained from a second interaction modality.

12. The method of fusing interaction data of claim 7, wherein the first collection comprises interaction data obtained from a first interaction modality and from a second interaction modality.

13. The method of fusing interaction data of claim 7, wherein the first collection comprises interaction data obtained from a first interaction modality and the second collection comprises interaction data obtained from the first interaction modality.

14. The method of fusing interaction data of claim 7, further comprising:

embodying a third collection of interaction data in a third interaction graph, the third collection comprising evidence of interactions between a plurality of third identifiers, and the third interaction graph comprises a plurality of third identifier nodes, each third identifier node associated with one of the plurality of third identifiers, wherein the plurality of entity mapping solutions further comprises a mapping of the third identifiers to one or more entities.

15. The method of fusing interaction data of claim 7, wherein identifying the optimal entity mapping solution further comprises using a computer system to simultaneously evaluate, for each one of the plurality of entity mapping solutions, two or more of the following: compatibility of identifier attributes, mutual information across interaction data sources, and the fit with one or more behavior models.

16. The method of fusing interaction data of claim 7, wherein identifying the optimal entity mapping solution further comprises using a computer system to evaluate, for each one of the plurality of entity mapping solutions, compatibility of identifier attributes, mutual information across interaction data sources, and the fit with one or more behavior models.

17. The method of fusing interaction data of claim 16, wherein identifying the optimal entity mapping solution further comprises using a computer system to simultaneously evaluate, for each one of the plurality of entity mapping solutions, compatibility of identifier attributes, mutual information across interaction data sources, and the fit with one or more behavior models.

18. The method of fusing interaction data of claim 7, wherein evaluation of the compatibility of identifier attributes comprises at least one of maximizing phonetic similarity between name attributes, minimizing differences between demographic attributes, minimizing differences between physical attributes, minimizing differences in spatial location attributes, minimizing differences in temporal attributes, and maximizing similarity between other semantic attributes.

19. The method of fusing interaction data of claim 7, wherein evaluation of the compatibility of identifier attributes comprises at least three of maximizing phonetic similarity between name attributes, minimizing differences between demographic attributes, minimizing differences between physical attributes, minimizing differences in spatial location attributes, minimizing differences in temporal attributes, and maximizing similarity between other semantic attributes.

20. The method of fusing interaction data of claim 19, wherein evaluation of the compatibility of identifier attributes further comprises simultaneous evaluation of at least three of phonetic similarity between name attributes, differences between demographic attributes, differences between physical attributes, differences between demographic attributes, differences in spatial location attributes, differences in temporal attributes, and similarity between other semantic attributes.

21. The method of fusing interaction data of claim 7, wherein identifying the optimal entity mapping solution further comprises using a computer system to evaluate, for each one of the plurality of entity mapping solutions, compatibility of identifier attributes and mutual information across interaction data sources.

22. The method of fusing interaction data of claim 21, wherein evaluation of mutual information across interaction data sources further comprises measuring the commonality of link structure between the edges in the first interaction graph and the second interaction graph.

23. The method of fusing interaction data of claim 22, wherein evaluation of mutual information across interaction data sources further comprises measuring the commonality of link structure between the edges in the first interaction graph and the second interaction graph under a specific mapping of identifiers to entities.

24. The method of fusing interaction data of claim 21, wherein evaluation of mutual information across interaction data sources further comprises evaluating all edges in the first interaction graph and the second interaction graph.

25. The method of fusing interaction data of claim 24, wherein evaluation of mutual information across interaction data sources further comprises evaluating all edges in the first interaction graph and the second interaction graph under a specific mapping of identifiers to entities.

26. The method of fusing interaction data of claim 21, wherein evaluation of mutual information across interaction data sources further comprises maximizing mutual information between the edges in the first interaction graph and the second interaction graph.

27. The method of fusing interaction data of claim 26, wherein evaluation of mutual information across interaction data sources further comprises maximizing mutual information between the edges in the first interaction graph and the second interaction graph under a specific mapping of identifiers to entities.

28. The method of fusing interaction data of claim 21, wherein evaluation of mutual information across interaction data sources further comprises minimizing the graph edit distance between the first interaction graph and the second interaction graph under a specific mapping of identifiers to entities.

29. The method of fusing interaction data of claim 21, wherein evaluation of mutual information across interaction data sources further comprises creating first and second working interaction graphs from the first and second interaction graphs, respectively, under a specific mapping of identifiers to entities.

30. The method of fusing interaction data of claim 29, wherein evaluation of mutual information across interaction data sources further comprises measuring the commonality of link structure between the first working interaction graph and the second working interaction graph.

31. The method of fusing interaction data of claim 29, wherein evaluation of mutual information across interaction data sources further comprises evaluating all edges in the first working interaction graph and the second working interaction graph.

32. The method of fusing interaction data of claim 29, wherein evaluation of mutual information across interaction data sources further comprises maximizing mutual information between the first working interaction graph and the second working interaction graph.

33. The method of fusing interaction data of claim 29, wherein evaluation of mutual information across interaction data sources further comprises minimizing the graph edit distance between the first working interaction graph and the second working interaction graph.

34. The method of fusing interaction data of claim 21, wherein compatibility of identifier attributes and mutual information across interaction data sources are evaluated simultaneously.

35. The method of fusing interaction data of claim 7, wherein identifying the optimal entity mapping solution further comprises using a computer system to evaluate, for each one of the plurality of entity mapping solutions, compatibility of identifier attributes and fit with one or more behavior models.

36. The method of fusing interaction data of claim 35, wherein the evaluation of fit with one or more behavior models comprises a multi-modality correlation model.

37. The method of fusing interaction data of claim 36, wherein the evaluation of fit with one or more behavior models comprises comparing differences in usages of interaction data sources over different time periods within the fused interaction graph.

38. The method of fusing interaction data of claim 35, wherein the evaluation of fit with one or more behavior models comprises comparing the fused interaction graph to one or more social structure models.

39. The method of fusing interaction data of claim 38, wherein the evaluation of fit with one or more behavior models comprises comparing the fused interaction graph to a power law social structure model.

40. The method of fusing interaction data of claim 38, wherein the evaluation of fit with one or more behavior models comprises comparing the fused interaction graph to a role-independent social structure model.

41. The method of fusing interaction data of claim 35, wherein the evaluation of fit with one or more behavior models comprises comparing the fused interaction graph to a role-specific model.

42. The method of fusing interaction data of claim 41, wherein the evaluation of fit with one or more behavior models comprises comparing the fused interaction graph to one or more of a bridge or an isolate model.

43. The method of fusing interaction data of claim 35, wherein the evaluation of fit with one or more behavior models comprises comparing the fused interaction graph to a task-specific model.

44. The method of fusing interaction data of claim 35, wherein the evaluation of fit with one or more behavior models comprises comparing the fused interaction graph to an event-specific model.

45. The method of fusing interaction data of claim 44, wherein the evaluation of fit with one or more behavior models comprises comparing the fused interaction graph to an implicit event-specific model.

46. The method of fusing interaction data of claim 35, wherein the compatibility of identifier attributes and fit with one or more behavior models are evaluated simultaneously.

47. The method of fusing interaction data of claim 7, further comprising user input.

48. The method entity fusion of claim 47 wherein the user input comprises adjusting the relative weight of compatibility of identifier attributes, mutual information across interaction data sources, and fit with one or more behavior models.

49. The method entity fusion of claim 47 wherein the user input comprises forcing a mapping of at least one identifier to an entity.

50. The method entity fusion of claim 47 wherein the user input comprises selection of a behavior model.

51. A computer system for fusing intelligence data from multiple intelligence modalities comprising:

a memory including program instructions;

a processor coupled to the memory, wherein the processor fetches the program instructions from the memory; and wherein, based on the program instructions fetched from the memory, the processor:

represents first intelligence data from a first intelligence modality in a first link-oriented dataset, said first intelligence data comprising one or more first identifiers specific to the first intelligence data, wherein "first identifier" means a moniker for an entity within the first intelligence data;

represents second intelligence data from a second intelligence modality in a second link-oriented dataset, said second intelligence data comprising one or more second identifiers specific to the second intelligence data, wherein "second identifier" means a moniker for an entity within the second intelligence data;

fuses the first link-oriented dataset and the second link-oriented dataset; and determines an optimal mapping of the first identifiers and second identifiers to entities, said optimal mapping comprising a plurality of links between a first entity and a second entity, wherein determining an optimal mapping of first identifiers and second identifiers comprises creating two or more fused graphs, wherein each of the two or more fused graphs is associated with a different assignment of first identifiers and second identifiers to a plurality of entities, and evaluating the link structures of the two or more fused graphs, and wherein determining an optimal mapping of the first identifiers and the second identifiers further comprises evaluating the compatibility of one or more attributes of the first identifiers and second identifiers, the degree of mutual information between the one or more attributes, and the degree of correspondence with preexisting behavior models.

52. The computer system of claim 51 wherein the processor collapses the plurality of links between the first entity and the second entity to a relationship.

53. A non-transitory computer-readable physical medium comprising a set of instructions that, when executed on a computer system comprising a computer-implemented graph analytics platform comprising a plurality of collections of interaction data collected from a plurality of interaction data sources, causes the computer system to:

embody a first collection of interaction data in a first interaction graph, the first collection comprising evidence of interactions between a plurality of first identifiers, wherein "first identifier" means a moniker for an entity in the first collection of interaction data, and the first interaction graph comprises a plurality of first identifier nodes, each first identifier node associated with one of the plurality of first identifiers, and a plurality of first edges between the first identifier nodes;

embody a second collection of interaction data in a second interaction graph, the second collection comprising evidence of interactions between a plurality of second identifiers, wherein "second identifier" means a moniker for an entity in the second collection of interaction data, and the second interaction graph comprises a plurality of second identifier nodes, each second identifier node associated with one of the plurality of second identifiers, and a plurality of second edges between the second identifier nodes;

define a plurality of entity mapping solutions, wherein each one of the plurality of entity mapping solutions comprises a mapping of the first identifiers and second identifiers to a plurality of entities;

associate with each one of the plurality of entity mapping solutions a fused interaction graph comprising a plurality of fused nodes and a plurality of aggregated edges, wherein each fused node is associated with a unique one of the plurality of entities in the entity mapping solution, and wherein, for each pair of fused nodes in the fused interaction graph, the aggregated edge between each member of the pair of fused nodes comprises all the edges between each identifier associated with the entities associated with each member of the pair of fused nodes; and identify an optimal entity mapping solution out of the plurality of entity mapping solutions, wherein identifying the optimal entity mapping solution comprises using the computer system to evaluate, for each one of the plurality of entity mapping solutions, two or more of the following: compatibility of identifier attributes, mutual information across interaction data sources, and fit with one or more behavior models.

54. A computer system for fusing interaction data, comprising:

a memory including program instructions;

a processor coupled to the memory, wherein the processor fetches the program instructions from the memory; and wherein, by executing the program instructions fetched from the memory, the processor causes the computer system to:

embody a first collection of interaction data in a first interaction graph, the first collection being one of a plurality of collections of interaction data collected from a plurality of interaction data sources, the first collection comprising evidence of interactions between a plurality of first identifiers, wherein "first identifier" means a moniker for an entity in the first collection of interaction data, and the first interaction graph comprises a plurality of first identifier nodes, each first identifier node associated with one of the plurality of first identifiers, and a plurality of first edges between the first identifier nodes;

embody a second collection of interaction data in a second interaction graph, the second collection being one of the plurality of collections of interaction data collected from a plurality of interaction data sources, the second collection comprising evidence of interactions between a plurality of second identifiers, wherein "second identifier" means a moniker for an entity in the second collection of interaction data, and the second interaction graph comprises a plurality of second identifier nodes, each second identifier node associated with one of the plurality of second identifiers, and a plurality of second edges between the second identifier nodes;

define a plurality of entity mapping solutions, wherein each one of the plurality of entity mapping solutions comprises a mapping of the first identifiers and second identifiers to a plurality of entities;

associate with each one of the plurality of entity mapping solutions a fused interaction graph comprising a plurality of fused nodes and a plurality of aggregated edges, wherein each fused node is associated with a unique one of the plurality of entities in the entity mapping solution, and wherein, for each pair of fused nodes in the fused interaction graph, the aggregated edge between each member of the pair of fused nodes comprises all the edges between each identifier associated with the entities associated with each member of the pair of fused nodes; and identify an optimal entity mapping solution out of the plurality of entity mapping solutions, wherein identifying the optimal entity mapping solution comprises using the computer system to evaluate, for each one of the plurality of entity mapping solutions, two or more of the following: compatibility of identifier attributes, mutual information across interaction data sources, and fit with one or more behavior models.

55. The computer system of claim 54 wherein the processor causes the computer system, in the fused interaction graph corresponding to the optimal entity mapping solution, to collapse each aggregated edge between two fused nodes into a single fused edge.

* * * * *